UNITED STATES PATENT OFFICE.

WRIGHT DURYEA, OF BROOKLYN, NEW YORK.

PROCESS OF TREATING AND RECOVERING THE GLUTINOUS AND FINE NITROGENOUS MATTER RESULTING FROM THE MANUFACTURE OF STARCH, &c.

SPECIFICATION forming part of Letters Patent No. 340,705, dated April 27, 1886.

Application filed August 7, 1884. Serial No. 139,917. (No specimens.)

*To all whom it may concern:*

Be it known that I, WRIGHT DURYEA, of the city of Brooklyn, in the county of Kings and State of New York, have discovered a new and useful Process for the Treatment and Recovery of the Glutinous and Fine Nitrogenous Matter Resulting from the Manufacture of Starch and Glucose, by means of which this residuum, which is ordinarily allowed to go to waste in other methods of treating starch-refuse, may be easily and economically reclaimed and utilized, of which the following is a specification.

In the manufacture of starch from corn the starch and glutinous substances are first separated from the coarse husky matter of the grain, and while mixed together in solution form what is known as the "starch-milk."

In order to separate the starch from the glutinous or refuse material with which it is combined, by what is known as the "sweet" or "alkaline" process, caustic soda or alkali of some character is added to the starch-milk, and the starch is allowed to deposit either upon depositing-planes or in vats by the siphoning process. Centrifugal machines are also used for separating the starch from the glutinous matter.

By all the methods of which I have any knowledge for the treatment and recovery of the refuse products of starch manufacture, when the separation of the starch from the starch-milk has been effected a greater or less quantity of the glutinous material remaining in the spent liquor is allowed to run to waste. Various attempts have been made to save this glutinous matter, or as much of it as possible, but heretofore by all the methods in use, as I understand them, a considerable quantity of valuable organic and glutinous material has been allowed to escape with the waste water.

The object of my invention is to recover and utilize practically the whole of this glutinous material; and my invention is based upon the discovery that by the addition of acid to the spent liquor or waste water, whatever glutinous substances are contained therein will readily and quickly precipitate and coagulate, so that the supernatant water free from organic matter can be drawn off and allowed to escape, leaving the glutinous material in a slimy mass at the bottom of the receptacle, to be thereafter utilized.

In addition to saving and utilizing valuable refuse material, by my process I also avoid all liability to cause nuisances and the disagreeable odors which are claimed to frequently arise from starch-works on account of the escape and subsequent fermentation or decomposition of the glutinous matter contained in the waste water.

Several methods and different apparatus are now in use or have been patented designed to reclaim and utilize the coarse husky refuse as well as the fine glutinous material resulting from starch manufacture. By my invention I save that which is lost by all the methods of treating starch-refuse of which I have any knowledge, and it is designed to supplement and render these methods more effective. My process is not primarily intended for the neutralization of the alkali in the spent liquor or waste water, but for coagulating and reclaiming the glutinous matter contained therein.

Although my invention is useful in combination with all other known methods for the recovery and treatment of the fine or glutinous portion of starch-refuse, by which the final waste starch-liquor from the operation of these methods is allowed to run to waste, holding in solution a greater or less quantity of glutinous matter, in practice I have only used it in combination with the apparatus and method for treating starch-refuse, shown in the application for Letters Patent made by Paul H. Grimm, dated December 31, 1883, and numbered Case No. 116,025, now pending. By the Grimm process the water is first expressed from the coarse husky refuse resulting from the sieving operation immediately after grinding. This expressed water is afterward sieved, in order to recover from it any refuse or solid matter which may not have been saved by the expressing operation, and the waste water from the sieve is retained in suitable tanks and allowed to settle, so as to recover from it any solid matter remaining. After the starch contained in the starch-milk resulting from the first sieving operation after grinding has deposited, (either in vats or upon depositing-planes,) the spent starch-liquor, holding in solution the larger part of the glutinous matter, is allowed to stand for several hours, in order that the gluten may settle. After remaining in tanks a sufficient length of time—usually from eight to twelve hours—the supernatant water is drawn off and allowed to run to waste, and the concentrated glutinous substances deposited in the bottom of the tanks are saved and mixed with the coarse pressed refuse. The supernatant or waste water thus drawn off, containing more or less glutinous matter in solution, I convey into proper receptacles, and by treatment with sulphuric acid and agitation cause a precipitation of the solid particles. After precipitation or coagulation I draw off the water which is run to waste and mix the glutinous matter deposited in the receptacles with the coarse and fine refuse previously treated, as above described; or I may use this reclaimed gluten separately for other purposes.

My process can also be used in connection and combination with the invention of E. S. Renwick for the treatment of starch-refuse, shown in United States Letters Patent No. 263,958, dated September 5, 1882. By this method the inventor filters under pressure the spent starch-liquor from the starch-depositories (whether vats or planes) through the coarse husky refuse of the grain, which takes up and retains a large portion of the glutinous matter contained in the spent starch-liquor. The water which escapes after the expressing operation contains a considerable quantity of glutinous matter in solution. This waste water I save and convey into tanks or other suitable receptacles, and by applying to it an acid—preferably sulphuric—and agitating it secure a precipitation and coagulation of the fine or glutinous material contained therein. This coagulated glutinous matter may then be added to the coarse refuse in the press in the same manner as the spent liquor is added to it, and further drained and mixed with the coarse refuse, as described in the specification of said patent, or may be added to the coarse and fine refuse after the expressing operation is finished, or may be otherwise utilized. This treatment of the waste water with an acid, it will be observed, occurs after the spent starch-liquor has been filtered through the coarse husky refuse, and not before filtration, as described in Renwick's said patent.

The primary object of the addition of acid to the waste water is not to neutralize the alkali contained therein and in the fine glutinous refuse held in suspension or solution, as proposed in said patent, but to precipitate and coagulate the glutinous matter. A quantity of acid which may be found adequate to sufficiently neutralize the alkali in the spent starch-liquor may not be the proper quantity to secure a speedy and economical precipitation of the glutinous material contained in the waste water.

My process can also be advantageously used in connection or combination with the invention of E. S. Renwick, shown in United States Letters Patent No. 272,324, dated February 13, 1883, for the treatment and utilization of starch-refuse. By the method described in said last-mentioned patent the coarse husky matter of the grain and the spent starch-liquor are first mixed together, and then passed over or through a draining-machine in the manner described in the specification. The coarse husky matter of the grain entangles and holds a considerable quantity of the fine glutinous material; but the waste water which escapes from the draining apparatus also contains a quantity of glutinous matter. This alkaline waste water I treat with acid, and thus cause a speedy precipitation and coagulation of the solid or glutinous matter contained therein in the bottom of any suitable receptacle into which the waste water may have been conveyed. The supernatant water being drawn off from the coagulated mass is allowed to escape, while the glutinous material remaining may be added to the coarse and fine refuse after passing from the draining-machine, or may be added to the coarse refuse and entangled and combined with it while the latter is being subjected to the draining operation. By this method of treatment I save and utilize all, except an inappreciable quantity, of the glutinous matter contained in the waste water, which otherwise would not be reclaimed.

My invention can also be used in combination with the invention of Henry C. Becker, shown in United States Letters Patent No. 260,736, dated July 11, 1882, for separating caustic alkali from gluten. By the process described in said last-mentioned patent, after the starch has been separated from the starch-milk the alkaline spent liquor containing glutinous material in solution is placed in suitable tanks, and then allowed to stand from six to twelve hours, at the end of which time the greater portion of the gluten and other nitrogenous matters will have settled to the bottom of the tanks. The supernatant water is then drawn off and allowed to run away, the glutinous material which has settled to the bottom of the tanks being retained and treated with sulphurous gas, in order to neutralize and remove the caustic alkali remaining in the glutinous matter. The alkaline waste water which is allowed to escape from the settling-tanks contains a considerable quantity of glutinous matter in solution. I collect this waste water in suitable tanks, and apply to it a sufficient quantity of acid—preferably sulphuric acid—to cause a precipitation and coagulation of the glutinous material held in solution, after which precipitation I draw off the supernatant water and allow it to escape. The glutinous matter remaining in the bottom of the tanks I then add to the gluten obtained by settling in the first instance, as described, before or after the treatment with sulphurous gas. By this method of treatment I am enabled to save and utilize the glutinous matter which by Becker's process is allowed to escape with the waste water.

My process of precipitating and coagulating the glutinous material held in solution in the final waste water can also be used in connection and combination with other methods for the treatment and utilization of the glutinous refuse from starch manufactured by the alkaline process, whereby such methods the glutinous material is not previously reclaimed.

In practicing my process I also find that, in addition to saving and utilizing the valuable refuse material which has heretofore been allowed to go to waste, I also avoid and prevent the alleged liability to create nuisances, and the consequent complaints which are frequently made against starch and glucose factories by reason of the discharge therefrom of waste material. The glutinous matter contained in the waste water, which is usually allowed to escape, readily ferments and may give off unwholesome and offensive odors. The prevention of these odors, alleged to arise from the daily discharge of even only small quantities of refuse material, has never heretofore been accomplished by any of the methods in use for treating the refuse from starch-works.

My process may be used for the treatment of the waste water from the manufacture of starch from other grains than corn, and an acid other than sulphuric acid may be used to effect a precipitation and coagulation of the organic matter contained in the waste water.

The gluten which is reclaimed by my process need not be mixed with the coarse refuse, and may be used for other purposes than for animal food.

I do not claim as new any mechanism, nor do I claim as new the use of an acid for the purpose of neutralizing the alkali contained in spent starch-liquor or in the glutinous material when separated from the spent liquor, nor do I claim the use of an acid for effecting a coagulation of the glutinous matter before mixing it with the coarse refuse prior to drainage or filtration, as shown in my invention for reclaiming gluten or glutinous matter, and described in United States Letters Patent No. 301,971, issued to me and dated July 15, 1884.

I am aware of Letters Patent No. 294,531, granted March 4, 1884, to W. W. Underhill, for an improvement in the art of manufacturing starch. The improvement described in that patent consisted in the treatment with sulphurous acid of the tailings or water from which a part of the starch has been obtained by subsidence, in order to produce an acid reaction, and in then running the so-treated tailings or water again over the starch planes or tables or submitting them to subsidence and decantation to recover the starch remaining therein.

The primary object of my invention is not to neutralize the alkali in the spent liquor or to recover starch, but to coagulate and reclaim the glutinous and nitrogenous matters which have heretofore been wasted.

What I do claim, and desire to secure by Letters Patent, is—

In combination with other methods for reclaiming the waste products resulting from starch or glucose manufacture, the process for the treatment and recovery of the glutinous or nitrogenous matter contained in the alkaline spent liquor or waste water which is allowed to escape in practicing these methods, consisting in saving such spent liquor or waste water and treating it with an acid, so as to cause a precipitation and coagulation of the glutinous matter contained therein, and the use of such glutinous matter, substantially as and for the purposes herein described.

In testimony whereof I have signed my name to this specification in the presence of two subscribing witnesses.

WRIGHT DURYEA.

Witnesses:
S. D. PHELPS,
EMIL SCHWARTZ.